(No Model.)

G. W. WADE & J. M. WARDELL.
ROTARY STEAM ENGINE.

No. 270,160. Patented Jan. 2, 1883.

WITNESSES:
Donn Twitchell
C. Sedgwick

INVENTOR:
G. W. Wade
J. M. Wardell
BY Munn & Co.
ATTORNEYS.

UNITED STATES PATENT OFFICE.

GEORGE W. WADE AND JOSHUA M. WARDELL, OF CADILLAC, MICHIGAN.

ROTARY STEAM-ENGINE.

SPECIFICATION forming part of Letters Patent No. 270,160, dated January 2, 1883.

Application filed July 3, 1882. (No model.)

*To all whom it may concern:*

Be it known that we, GEORGE W. WADE and JOSHUA M. WARDELL, of Cadillac, Wexford county, Michigan, have invented a new and useful Improvement in Rotary Steam-Engines, of which the following is a full, clear, and exact description.

This invention is an improvement upon the rotary engine on which Letters Patent were granted us March 7, 1882, No. 254,737, and in which the case of the engine is of ellipsoidal shape in its cross-section and drawn in at the sides of its shortest diameter, with adjustable packings fitting recesses in such drawn-in sides to form a close working joint with a radially-slotted revolving cylinder that forms a central steam-chest, and is provided with revolving heads that close the opposite ends of the case, and with a series of radially-sliding pistons pressed outward by the steam, and against the faces of which the steam acts to rotate the cylinder.

The invention consists in a novel arrangement of reversing valves and passages, and means for operating the same to change the direction in motion of the engine by admitting steam to opposite sides of the pistons, of which there are four equidistant ones for the purpose of producing a better balancing effect.

The invention also consists in a combination, with the revolving hollow cylinder and its radially-sliding pistons or valves and passages therefor, of circular cut-off valves having their axes of motion coincident with that of the cylinder, for working the engine under different degrees of expansion.

Reference is to be had to the accompanying drawings, forming part of this specification, in which similar letters of reference indicate corresponding parts in both figures.

Figure 1:
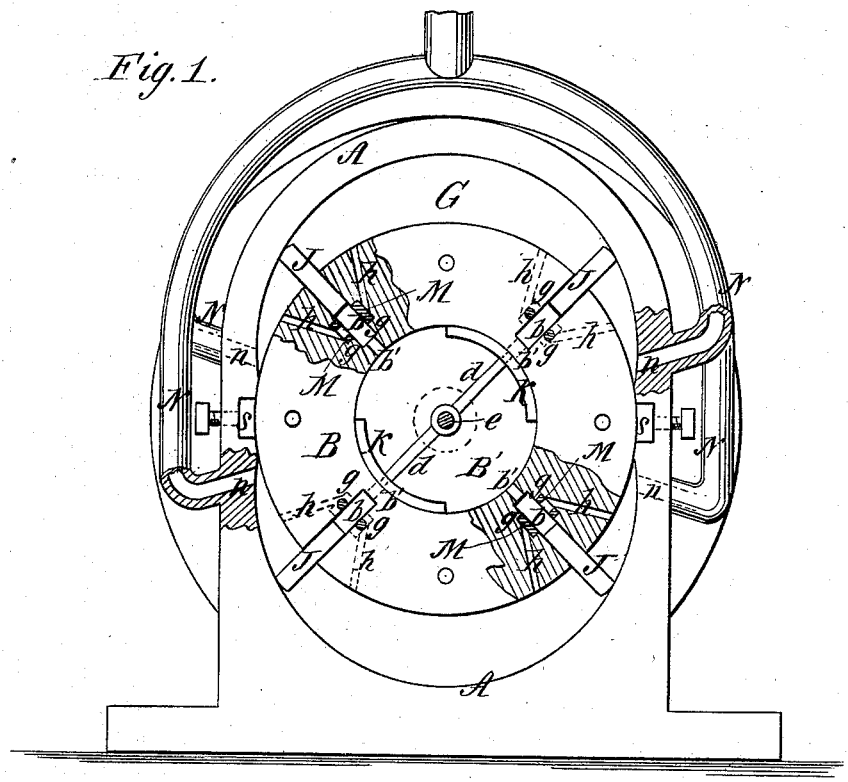
Figure 2:
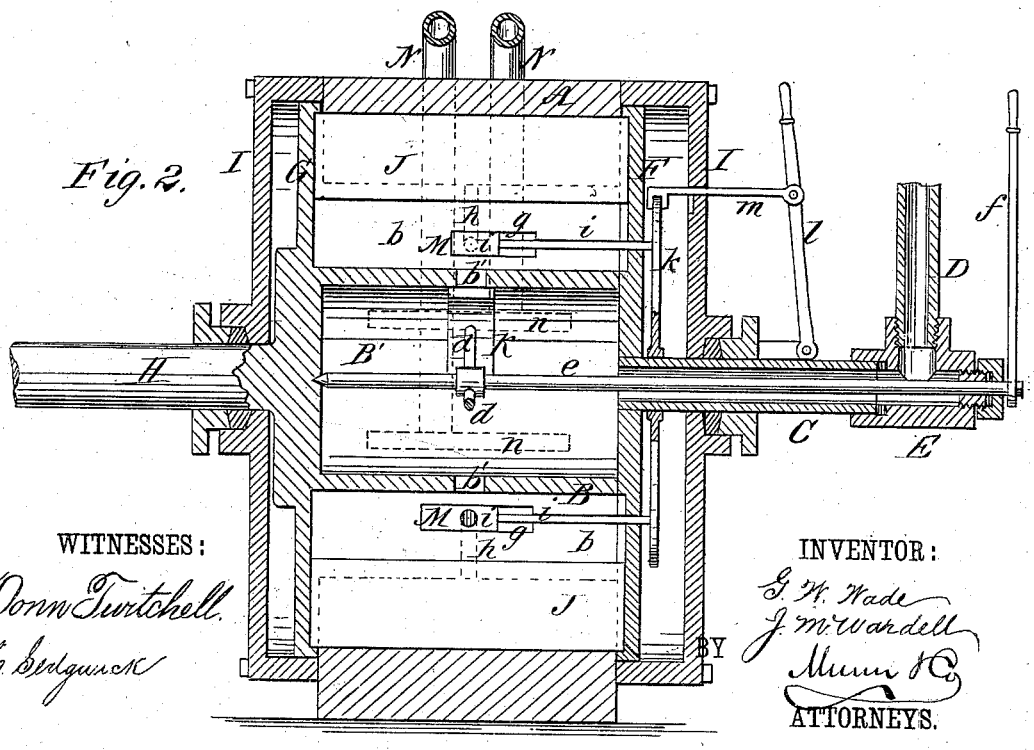

Figure 1 is an end elevation of the engine with a head removed and with parts broken away to exhibit other parts, and Fig. 2 is a central vertical section of the same in a plane at right angles to Fig. 1.

In the drawings, A is the ellipsoidal-shaped case, drawn in at the sides of its shortest diameter, and fitted with adjustable packings $s$, to make a close joint with the revolving cylinder B, which is constructed to form a central steam chest or chamber, B', to which steam is admitted by a central attached revolving pipe, C, and branch D, connected with a hollow bearing, E.

F G are the heads at the ends of the cylinder B, and extended so as to inclose the ends of the case A, said heads rotating in common with the cylinder, central steam-pipe, C, and engine-shaft H. Outside of these heads, one of which is made removable, are stationary inclosing-caps I I, secured to the ends of the case to prevent external leakage.

J J are the radially-sliding valves or pistons, of which there are four, arranged at equal distances apart within corresponding slots $b\ b$ in the cylinder B, which slots are in communication at their inner ends with the steam-chamber B' of said cylinder.

Arranged within the steam-chamber B', so as to control the inner terminations or inlets, $b'$, of the slots $b$, are two opposite circular or segmental cut-off valves, K K, that may be loosely fitted on the ends of a cross-bar, $d$, which is carried by a shaft or spindle, $e$, that is coincident with the axis of the cylinder B, and extends through the pipe C and bearing F. These valves K K are controlled by a lever, $f$, on the outer end of the shaft $e$. The steam is admitted by the inlets $b'$ to act upon the pistons J J, for the purpose of propelling the engine, and the cut-off valves K K serve to cut off the steam expansively within the case A. These valves K K remain stationary when the engine is running; but in starting they are moved by the lever $f$ sufficiently to allow the engine to take steam to start it, after which they are put in proper position and secured. The pistons J J are made solid, and the slots $b\ b$, in which they work, connect on their opposite side with recesses or valve-chambers $g\ g$, in which are fitted a pair of reversing-valves, M M, for each piston J. From each pair of valve-chambers $g\ g$ angling ports or passages $h\ h$, diverging outwardly, project to and through the circumferential exterior of the cylinder B. The valves M M of each pair of valves are so set and arranged that when one valve closes the passage $h$ which it controls the other valve uncovers its port $h$, and accordingly as each of said ports is opened or closed is the engine reversed by changing the admission of steam to the opposite sides or faces of the pistons J J. Said valves are operated by their connection, through rods $i\ i$, with a ring, k, that rotates in common with the cylinder B, and which is slid in or out over the central pipe, C, by a lever, l, and clutch-rod m, within which the ring k revolves.

To provide for reversing the engine, as described, each side of the engine must have duplicate exhaust-ports and branches or pipes n N, arranged to communicate with the case A at a sufficient distance apart above and below or on opposite sides of the packings s s, corresponding with the diverging ends of the ports h h. These duplicate exhaust-ports and branches n N must be closed on one side of the engine and opened on the other, according to the direction in which the engine is being run by the adjustment of the reversing-valves M M.

Instead of the steam-pipe C being made to revolve, it may be stationary, and a stuffing-box in the head be fitted to revolve around the pipe.

Having thus described our invention, we claim as new and desire to secure by Letters Patent—

1. The combination of the cut-off valves K with the revolving cylinder B, having a central steam-chamber, B', radially-sliding pistons J, and ports or inlets b', for passage of the steam through the cylinder to act upon the sides or faces of the pistons, and the ellipsoidal case A, substantially as specified.

2. The combination, with the revolving cylinder B, having a central steam-chamber, B', and ports or inlets b', of the cut-off valves K K, the cross-bar d, the shaft e, having its axis coincident with that of the cylinder, and the lever f, essentially as and for the purposes herein set forth.

3. In a rotary engine having a hollow revolving cylinder fitted with radially-sliding pistons for operation within a fixed case of varying diameters, and having duplicate exhaust-ports n n on opposite sides of it, the combination of the reversing-valves M M with the revolving cylinder B, having a central steam-chamber, B', ports or inlets b', radial slots b for the pistons, recesses or chambers g g for the valves M M on opposite sides of the slots, and outwardly-diverging passages h h from said chambers, essentially as shown and described.

4. The combination of the revolving ring k, clutch-rod m, lever l, and rods i, with the reversing-valves M M, the revolving heads F G and their attached revolving cylinder B', having radial piston-slots b, inlets b', reversing-valve chambers g g on opposite sides of said slots, and outwardly-diverging ports or passages from said chambers g g, substantially as specified.

GEORGE WILLASON WADE.
JOSHUA M. WARDELL.

Witnesses:
CHARLES C. DUNHAM,
WILLIAM CASSLER.